United States Patent [19]

Paschke et al.

[11] 4,393,162

[45] Jul. 12, 1983

[54] POLYAMIDES AND COPOLYAMIDES COMPRISING -1,2-DI(P-AMINOPHENOXY) ETHANE MOIETIES

[75] Inventors: Edward E. Paschke, Wheaton; C. Bruce Petty-Weeks, Naperville, both of Ill.

[73] Assignee: Standard Oil Company (Indiana), Chicago, Ill.

[21] Appl. No.: 378,119

[22] Filed: May 14, 1982

[51] Int. Cl.$^3$ .................. C08G 69/32; C08G 69/40
[52] U.S. Cl. .................................. 524/606; 524/607; 528/125; 528/128; 528/172; 528/183; 528/185
[58] Field of Search ............... 528/125, 128, 172, 183, 528/185; 524/606, 607

[56]  References Cited

U.S. PATENT DOCUMENTS 3,505,288  4/1970  Bodesheim et al. ................. 528/185
4,278,786  7/1981  Nanaumi et al. .................... 528/185

Primary Examiner—Lester L. Lee
Attorney, Agent, or Firm—Gunar J. Blumberg; William T. McClain; William H. Magidson

[57]  ABSTRACT

Novel polyamides and copolyamides are prepared from 1,2-di(p-aminophenoxy) ethane and diacids or mixtures of 1,2-di(p-aminophenoxy) ethane and other diamines and diacids. These polyamides and copolyamides are useful as molded objects, fiber, films, laminate and coating.

30 Claims, No Drawings

POLYAMIDES AND COPOLYAMIDES COMPRISING -1,2-DI(P-AMINOPHENOXY) ETHANE MOIETIES

BACKGROUND OF THE INVENTION

1. Field of the Invention

The field of this invention relates to polyamides and copolyamides prepared from 1,2-Di-(p-aminophenoxy)ethane, hereinafter referred to as "DAPE." DAPE and a mixture of other aliphatic or aromatic diamines may also be suitably used to react with the diacids and aliphatic or aromatic diacids. These novel polyamides and copolyamides are useful in the preparation of fiber, laminates, coatings, molded articles and filled articles, and glass charcoal filled molded articles.

BACKGROUND OF THE INVENTION

It is known to make polyamide-imides from trimellitic anhydride chloride and aliphatic or aromatic diamide in polar solvent (see U.S. Pat. Nos. 3,661,832 and 3,260,691). The hydrochloric acid production in this process is removed by precipitation of the polymer in a precipitant, such as water. Alternatively, U.S. Pat. No. 3,347,828, shows that the hydrochloric acid may be neutralized by adding alkaline oxides. British Patent Specification No. 570,858, U.S. Pat. Nos. 3,732,188, and 3,239,491, describe various processes for making fiber from polyamides. In reviewing these references, it is clear that the use of DAPE to form polyamides useful as moldings, fibers, laminates and coatings and filled molded articles has not been contemplated in the prior art.

The general object of this invention is to provide novel polyamides based on DAPE moieties and aromatic or aliphatic acids or their halide derivatives. Another object is to provide novel copolyamides based on DAPE moieties and another aromatic or aliphatic diamine and aromatic or aliphatic acids. A more specific object of this invention is to provide polyamides and copolyamides from DAPE moieties and aliphatic, cycloaliphatic, araliphatic and aromatic moieties and aromatic and aliphatic diacids. Another object is to provide a process for the manufacture of copolyamides and polyamides from DAPE and diacids or DAPE and other diamines and diacids.

We have found that novel polyamides and copolyamides can be formed by reacting DAPE with aromatic or aliphatic diacids. We have also found that DAPE can be replaced up to 90 percent by other aliphatic or aromatic diamines and the resulting mixture reacted with aromatic or aliphatic diacids. DAPE or a mixture of DAPE and other aromatic or aliphatic diamines react readily with diacids to form high molecular weight polyamides. In the novel process, both aliphatic and aromatic diacids can be polymerized with DAPE or DAPE and another diamine in the melt to form high molecular weight polyamides. Our process for the manufacture of the novel polyamides and copolyamides comprises reacting DAPE with an aromatic or aliphatic diacid or, alternatively, a mixture of DAPE and another diamine can be reacted with one or more diacids. The molecular ratio of the total diamine moieties may be in the range of about 0.97:1.03 to 1.03:0.97, preferably in the range of 1:1 to the total diacid moieties. In a suitable process, the reaction is conducted as a batch reaction at a temperature of about 0° to 100° C. for a period of about 0.01 to 2.0 hours in a nitrogen or halogen containing organic polar solvent such as 1-methyl-2-pyrrolidone, N,N-dimethylacetamide, pyridine, chloroform or methylene chloride or dichloromethane. The polycondensation can suitably be carried out at a temperature of about 200° to about 350° C., preferably at a temperature of about 225° to 300° C. The order of addition of the reactants is not critical and all reactants can be added simultaneously in any order desired.

The novel polyamides and copolyamides of this invention have the following recurring structure:

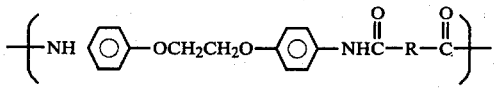

R can be the —CH$_2$— group containing from about 1 to about 20 repeating units. The preferred aliphatic groups are CH$_2$ taken twice, four times or ten times. Suitable aromatic diacids have the following structure:

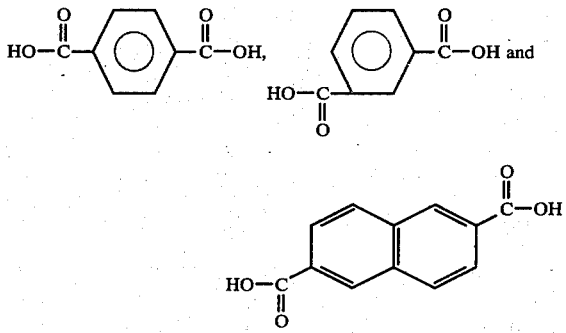

and are derived from terephthalic acid, isophthalic acid and 2,6-naphthylylene dicarboxylic acid.

The copolyamides of this invention have the following recurring structure:

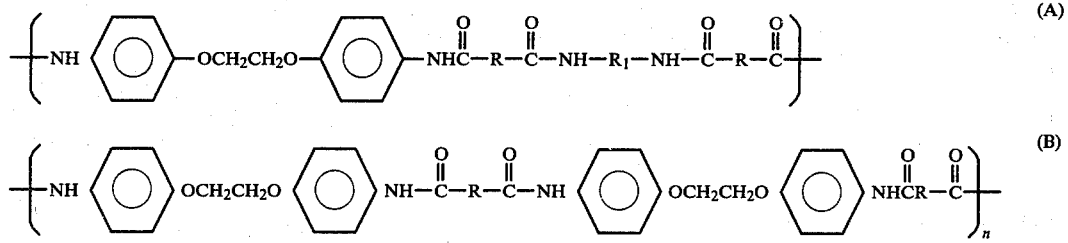

In these structures, R has the same values as for the polyamide, but R$_1$, meaning the moiety derived from the other diamine, can be divalent aliphatic hydrocarbons from 2 to 18 carbon atoms, or are aromatic hydrocarbons from 6 to 20 carbon atoms or aromatic hydrocarbons from 6 to 10 carbon atoms, joined together or by stable linkage comprising —O—, methylene,

—SO—, SO$_2$—, and —S— radicals. The radical R$_1$ is derived from aliphatic, araliphatic or cycloaliphatic diamines such as ethylenediamine, propylenediamine, 2,2-dimethylpropylene diamine, tetramethylene diamine, hexamethylene diamine, octamethylene diamine, nonamethylene diamine, decamethylene diamine, dodecamethylenediamine, 4,4'-diaminodicyclohexylmethane, xylylene diamine and bis(aminomethyl)cyclohexane. Suitable aromatic diamines, which can be mixed with DAPE used in Applicants' process, include para- and meta-phenylenediamine, oxybis(aniline), thiobis(aniline), sulfonylbis(aniline), diaminobenzophenone, methylenebis(aniline), benzidine, 1,5-diaminonaphthalene, oxybis(2-methylaniline), thiobis(2-methylaniline), and the like. Examples of other useful aromatic primary diamines are set out in U.S. Pat. No. 3,494,890 (1970) and U.S. Pat. No. 4,016,140 (1972) both incorporated herein by reference.

In some cases the polyamide may be further polymerized under "solid state polymerization" conditions. The term solid state polymerization refers to chain extensions of polymer particles under conditions where the polymer particles retain their solid form and do not become a fluid mass. The solid state polymerization can be carried out below the melting point of the polyamide and can be conducted in several ways. However, all techniques require heating the ground or pelletized polyamide below the melting point of the polyamide, generally at a temperature of about 150° C. to 250° C. while either sparging with an inert gas, such as nitrogen or air, or operating under vacuum. In cases where the polyamides have a low melt temperature, they can be polymerized in the melt under vacuum in thin sections or using thin film reactors known in the art.

Injection molding of the novel polyamide is accompanied by injecting the polyamide into a mold maintained at a temperature of about 23° C. to about 200° C. In this process a 20 second to 1 minute cycle is used with a barrel temperature of about 200° C. to about 350° C. The latter will vary depending on the Tg of the polymer being molded.

The novel polyamides and copolyamides have excellent mechanical and thermal properties and can readily be molded, formed into fibers, films, laminates or coatings.

We have found that the polyamides of this invention are improved by the addition of reinforcing materials, particularly the mechanical properties of the polyamides are improved if these polyamides contain from about 25 to 60 percent by weight glass fibers, glass beads, minerals or graphite or mixtures thereof. In the preferred range the polyamides contain 30 to 40 percent by weight of the glass fibers, glass beads, or graphite or mixtures thereof. Suitable reinforcing materials can be glass fibers, glass spheres, or glass fabrics. The glass fibers are made of alkali-free boron-silicate glass or alkali containing C-glass. The thickness of the fiber is suitably on the average between 3 mm and 30 mm. It is possible to use both long fibers with average lengths of from 5 to 50 mm and also short fibers of an average filament length from 0.05 to 5 mm. In principle, any standard commercial-grade fibers, especially glass fibers, may be used. Glass beads ranging from 5 mm to 50 mm in diameter may also be used as a reinforcing material.

The reinforced polyamide polymers and copolymers may be prepared in various ways. For example, so-called rowing endless glass fiber strands are coated with the polyamic acid melt and subsequently granulated. The cut fibers or the glass beads may also be mixed with granulated polyamic acid and the resulting mixture melted in a conventional extruder, or alternatively, the fibers may be directed, introduced into the polyamic acid melt through a suitable inlet in the extruder. Injection molding of the novel glass-filled polyamides and copolyamides is accomplished by injecting the polyamides into a mold maintained at a temperature of about 50° to 150° C. In this process a 20 second cycle is used with a barrel temperature of about 200° to 350° C. The injection molding conditions are given in Table 1.

TABLE I

| | |
|---|---|
| Mold Temperature | 100 to 200° F. |
| Injection Pressure | 15,000 to 19,000 psi and held for 1 to 3 seconds |
| Back Pressure | 100 to 220 psi |
| Cycle Time | 25 to 28 seconds |
| Extruder: | |
| Nozzle Temperature | 600 to 630° F. |
| Barrels: | |
| Front heated to | 600 to 630° F. |
| Screw: | 20 to 25 revolutions per minute |

In a suitable preparation 0.026 moles of DAPE, 0.0371 moles of triethylamine and 400 ml of a solvent such as dichloromethane are blended and 0.0205 moles of either adipoyl chloride or isophthaloyl chloride, or terephthaloyl chloride or a mixture of these dissolved in a suitable solvent such as dichloromethane are added. The mixing is continued for a time effective to precipitate the copolyamide. These solid copolyamides have inherent viscosity of at least 0.45 dl/g measured in sulfuric acid at a temperature of 25° C. These polyamides have an inherent viscosity in excess of 1.3 dl/g measured in sulfuric acid at 25° C. after heating at a temperature of about 200° C. and 4 mm mercury for a period of about two hours.

The following examples illustrate the preferred embodiment of the invention. It will be understood that the examples are for illustrative purposes only and do not purport to be wholly definitive with respect to conditions or scope of the invention.

EXAMPLE 1

To rapidly stirring solution of 5.00 g (0.0205 mole) of DAPE, 4.56 g (0.0451 mole) triethylamine and 400 ml of dichloromethane in a Waring blender was added a solution of 2.08 g (0.0102 mole) of terephthaloyl chloride and 2.08 g (0.0102 mole) of isophthaloyl chloride dissolved in 200 ml of dichloromethane. Mixing was continued for ten minutes. The solid copolyamide was filtered, washed with water, and dried to give 7.61 g (99 percent of theory) of product. The inherent viscosity measured in sulfuric acid was 0.78 dl/g. The Tg was 160° C. Tough films were compression molded.

EXAMPLE 2

To a rapidly stirring solution of 5.02 g (0.0206 mole) of DAPE, 4.58 g (0.0371 mole) of triethylamine and 400 ml of dichloromethane in a Waring blender was added a solution of 3.76 g (0.0205 mole) of adipoyl chloride dissolved in 200 ml of dichloromethane. Mixing was continued for ten minutes. The solid polyamide was filtered, washed with water, and dried to give 6.99 g (96 percent of theory) of product. The inherent viscosity measured in sulfuric acid was 0.45 dl/g. The product after heating at 200° C. and 4 mm Hg for two hours had a 1.33 dl/g inherent viscosity. The polyamide had a crystalline melting temperature of 381° C.

EXAMPLE 3

To a rapidly stirred solution of 5.00 g (0.0205 mole) of DAPE, 4.56 g (0.0451 mole) of triethylamine and 400 ml of dichloromethane in a Waring blender was added a solution of 4.61 g (0.0205 mole) of isophthaloyl chloride dissolved in 200 ml of dichloromethane. Mixing was continued for ten minutes. The solid polyamide was filtered, washed with water, and dried to give 7.43 g (80 percent of theory) of product. The inherent viscosity measured in sulfuric acid was 0.89 dl/g.

EXAMPLE 4

To a rapidly stirred solution of 5.00 g (0.0205 mole) of DAPE, 4.56 g (0.0451 mole) of triethylamine and 400 ml of dichloromethane in a Waring blender was added a solution of 4.16 (0.0205 mole) of terephthaloyl chloride dissolved in 200 ml of dichloromethane. Mixing was continued for ten minutes. The solid polyamide was filtered, washed with water, and dried to give 7.42 g (80 percent of theory) of product. The inherent viscosity measured in sulfuric acid was 0.62 dl/g.

We claim:

1. A polyamide comprising the following recurring structure:

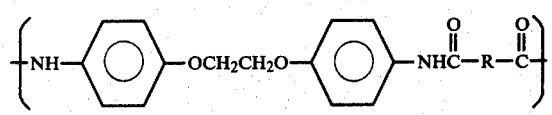

wherein R is a divalent aliphatic or aromatic hydrocarbon radical or an aromatic hydrocarbon radical containing from 6 to 10 carbon atoms joined directly or by a stable linkage selected from the group consisting of —O—, methylene

—SO—, —SO$_2$— and S radicals.

2. The polymer of claim 1 wherein R is an aliphatic hydrocarbon from 2 to 18 carbon atoms.
3. The polyamide of claim 1 wherein R is an aromatic hydrocarbon from 6 to 20 carbon atoms.
4. The polyamide of claim 1 wherein the aromatic hydrocarbon radical contains from about 6 to about 10 carbon atoms joined directly or by stable linkage consisting essentially of —O—, methylene,

—SO—, —SO$_2$—, and —S—.

5. The polyamide of claim 1 wherein the polyamide is in the form of a molded object.
6. The polyamide of claim 1 wherein the polyamide is in the form of a fiber.
7. The polyamide of claim 1 wherein the polyamide is in the form of a laminate.
8. The polyamide of claim 1 wherein the polyamide is in the form of a film.
9. The polyamide of claim 5 wherein the molded object contains about 30 to 50 weight percent of glass fiber, glass beads or graphite.
10. A copolyamide comprising the following recurring structure:

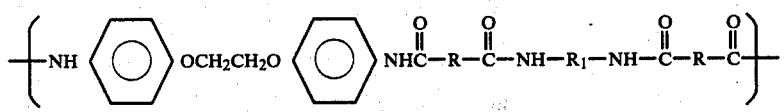

and

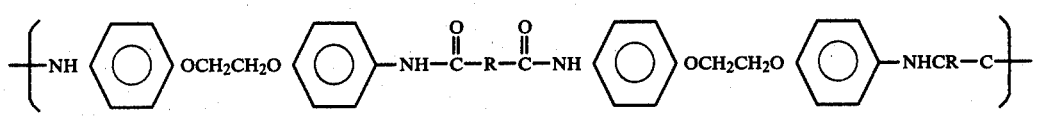

wherein R and R$_1$ are the same or different divalent aliphatic or aromatic hydrocarbon radicals or an aromatic hydrocarbon radical containing from 6 to 10 carbon atoms joined directly or by a stable linkage selected from the group consisting of —O—, methylene,

—SO—, —SO$_2$— and S radicals.

11. The copolyamide of claim 10 where R and R$_1$ are aliphatic hydrocarbons from 2 to 18 carbon atoms.
12. The copolyamide of claim 1 wherein R and R$_1$ are aromatic hydrocarbons from 6 to 20 carbon atoms.
13. The copolyamide of claim 10 wherein the aromatic, hydrocarbon radical contains from about 6 to 10 carbon atoms joined directly or by stable linkage consisting essentially of —O—, methylene,

—SO—, —SO$_2$—, and —S— radicals.

14. The copolyamide of claim 10 wherein the copolyamide is in the form of a molded object.

15. The molded object of claim 14 wherein the molded object contains about 30 to 50 weight percent of glass fiber, glass beads or graphite.

16. The copolyamide of claim 10 wherein the copolyamide is in the form of a fiber.

17. The copolyamide of claim 10 wherein the copolyamide is in the form of a film.

18. The copolyamide of claim 10 wherein the copolyamide is in the form of a laminate.

19. The copolyamide of claim 11 wherein R and R$_1$ are divalent aliphatic hydrocarbons containing five carbon atoms.

20. The copolyamide of claim 19 wherein the copolyamide is in the form of a molded object.

21. The molded object of claim 19 wherein the molded object contains about 30 to 50 weight percent of glass fiber, glass beads or graphite.

22. The copolyamide of claim 19 wherein the copolyamide is in the form of a fiber.

23. The copolyamide of claim 19 wherein the copolyamide is in the form of a film.

24. The copolyamide of claim 19 wherein the copolyamide is in the form of a laminate.

25. The copolyamide of claim 12 wherein R and R$_1$ are the same or different containing the following divalent hydrocarbon moieties:

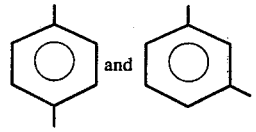

26. The copolyamide of claim 25 wherein the copolyamide is in the form of molded objects.

27. The molded object of claim 25 wherein the molded object contains about 30 to 50 weight percent of glass fiber, glass beads or graphite.

28. The copolyamide of claim 25 wherein the copolyamide is in the form of a film.

29. The copolyamide of claim 25 wherein the copolyamide is in the form of a laminate.

30. The copolyamide of claim 25 wherein the copolyamide is in the form of a fiber.

* * * * *